(12) United States Patent
Turner et al.

(10) Patent No.: US 8,008,795 B2
(45) Date of Patent: Aug. 30, 2011

(54) POWER GENERATION SYSTEM, WIND TURBINE, AND A METHOD OF CONTROLLING THE WIND TURBINE FOR SUPPLYING POWER TO AN ELECTRICAL GRID

(75) Inventors: William Brian Turner, Bourne (GB); Neil Brown, Holbeach (GB); Richard Meadows, Canterbury (GB); Andreas Biebighaeuser, Ingolstadt (DE)

(73) Assignee: Cummins Generator Technologies Limited, Stamford, Lincolnshire (GB)

( * ) Notice: Subject to any disclaimer, the term of this patent is extended or adjusted under 35 U.S.C. 154(b) by 379 days.

(21) Appl. No.: 12/250,620

(22) Filed: Oct. 14, 2008

(65) Prior Publication Data

US 2009/0096212 A1   Apr. 16, 2009

(30) Foreign Application Priority Data

Oct. 15, 2007   (GB) .................................. 0720157.7

(51) Int. Cl.
*F03D 13/00*   (2006.01)
(52) U.S. Cl. ............................ 290/44; 290/55
(58) Field of Classification Search .................... 290/43, 290/44, 54, 55; 415/7, 2.1, 4.1, 4.2, 4.3, 415/4.5; 416/132 B, 1, 7, DIG. 4; 60/398
See application file for complete search history.

(56) References Cited

U.S. PATENT DOCUMENTS

| | | | | |
|---|---|---|---|---|
| 4,461,957 A * | 7/1984 | Jallen | | 290/44 |
| 4,613,763 A * | 9/1986 | Swansen | | 290/44 |
| 5,311,062 A * | 5/1994 | Farkas | | 290/4 R |
| 5,434,454 A * | 7/1995 | Farkas | | 290/4 R |
| 5,436,507 A * | 7/1995 | Brown et al. | | 290/52 |
| 6,093,975 A * | 7/2000 | Peticolas | | 290/52 |
| 6,504,261 B2 * | 1/2003 | Fogarty et al. | | 290/52 |
| 6,563,229 B2 * | 5/2003 | Farkas | | 290/30 A |
| 6,573,626 B1 * | 6/2003 | Gosebruch et al. | | 310/74 |
| 6,581,559 B1 * | 6/2003 | Grob et al. | | 123/179.3 |
| 6,897,577 B2 * | 5/2005 | Weeber et al. | | 290/52 |
| 7,042,108 B2 * | 5/2006 | Farkas | | 290/3 |
| 2007/0057515 A1 * | 3/2007 | Daniels | | 290/44 |
| 2008/0223684 A1 * | 9/2008 | Duffey et al. | | 192/105 R |
| 2010/0096853 A1 * | 4/2010 | Woldmann et al. | | 290/44 |

FOREIGN PATENT DOCUMENTS

| | | |
|---|---|---|
| EP | 0 982 828 A2 | 3/2000 |
| EP | 0 982 828 A3 | 3/2000 |

OTHER PUBLICATIONS

United Kingdom Search Report issued in GB Application No. 0720157.7, dated Jan. 21, 2008.

* cited by examiner

*Primary Examiner* — Tho D Ta
(74) *Attorney, Agent, or Firm* — Hamre, Schumann, Mueller & Larson, P.C.; J. Bruce Schelkopf

(57) ABSTRACT

A power generation system is disclosed for supplying power to an electrical grid. The system comprises a synchronous machine and coupling means for coupling the synchronous machine to a prime mover. Control means are provided to control the system such that the system is selectively operable in two modes. In the first mode, the synchronous machine is coupled to the prime mover and acts as a synchronous generator to supply power to the grid. In the second mode the synchronous machine is decoupled from the prime mover and acts as a synchronous condenser. This can allow parameters of the grid, such as power factor and voltage, to be adjusted.

18 Claims, 3 Drawing Sheets

POWER GENERATION SYSTEM, WIND TURBINE, AND A METHOD OF CONTROLLING THE WIND TURBINE FOR SUPPLYING POWER TO AN ELECTRICAL GRID

BACKGROUND TO THE INVENTION

The present invention relates to a power generation system for supplying electrical power to a power distribution system, and in particular (although not exclusively) to a power generation system utilising an alternative energy source such as wind power, wave power and tidal flow.

Alternative energy sources are characterised by the fluctuating nature of the energy source. For this reason, power generation systems using alternative energy sources have typically used a variable speed electrical generator coupled to the energy source, together with power electronics at the output of the generator in order to convert the output of the generator into a form suitable for supply to an electrical grid.

With the development of variable speed drive technology, it has now become feasible to use synchronous generators running at synchronous speed in alternative energy power generation systems. Synchronous generators have the advantage that they can be directly connected to the grid, and that their behaviour when connected to the grid is predictable.

Alternative energy sources are often located at long distances from centres of population, and may require long transmission lines to supply power to areas where it is needed. Long transmission lines tend to create a capacitance effect due to the long parallel conductors. This in turn may cause the system to have a leading power factor. If the leading power factor becomes too pronounced the system may become unstable.

Under normal conditions a leading power factor may be compensated by reactive loads in the system, or by the grid company switching in reactors at power sub-stations. However during periods of light loads the leading power factor may not be adequately compensated in this way. One solution in such situations would be to disconnect some transmission lines. However this may result in inefficient use of the energy which is potentially available from alternative energy sources.

SUMMARY OF THE INVENTION

According to a first aspect of the present invention there is provided a power generation system for supplying power to an electrical grid, the system comprising:

a synchronous machine;

coupling means for coupling the synchronous machine to a prime mover; and control means arranged to control the system such that the system is selectively operable in two modes, wherein, in the first mode, the synchronous machine is coupled to the prime mover and acts as a synchronous generator to supply power to the electrical grid, and in the second mode, the synchronous machine is decoupled from the prime mover and acts as a synchronous condenser.

By providing a power generation system having a synchronous machine which is selectively operable as a synchronous condenser, it may be possible to adjust a parameter of the grid, such as power factor or voltage. The adjustment may be carried out to a large extent using equipment which is already available, thereby providing an economical solution to the problem of adjusting power factor and other parameters. The adjustment may take place close to the point of power generation. This may allow the continued use of transmission lines which might otherwise need to be switched out of the system. Thus the present invention may allow more efficient use of energy sources such as alternative energy sources.

Preferably, when the system is in the second mode, the synchronous machine is arranged to adjust the power factor and/or the voltage of the electrical grid. Amongst other things, this may help to compensate for the capacitance effect of a transmission line.

Preferably the control means is arranged to control the coupling means so that in the first mode the coupling means couples the synchronous machine to the prime mover, and in the second mode the coupling means decouples the synchronous machine from the prime mover. The coupling means may be, for example, a clutch, or any other type of coupling/decoupling mechanism.

A synchronous machine for power generation typically comprises a rotor holding a field winding which is magnetised by an excitation current. It is normally desirable to control the excitation in accordance with the power output of the machine. Thus, in the first mode, the control means may be arranged to control the excitation of the synchronous machine in accordance with the electrical power which is to be supplied to the grid. For example the control means may comprise an Automatic Voltage Regulator (AVR).

When the synchronous machine is operating as a synchronous condenser, it may be desirable to control the amount of reactive power supplied by the machine, in order to adjust the power factor of the power distribution system. This may be achieved by adjusting the excitation. Thus, in the second mode, the control means may be arranged to control the excitation of the synchronous machine in order to control the reactive power of the machine.

In order to provide a wider range of reactive powers, the synchronous machine may be designed to operate across a range of power factors that would not normally be encountered by a synchronous generator. For example, when in the second mode, the synchronous machine may be operable with a leading power factor of less than 0.9, or less than 0.85 or less than 0.8, or some other value, down to zero power factor, dependent on being within the machine design operating/control/power chart.

When in the second mode, the appropriate reactive power of the machine may be determined locally, for example by monitoring local grid conditions. However in some circumstances it may be desirable for the power generation system to be controllable remotely. For example, a grid company may wish to control the operation of the system in order to adjust conditions elsewhere in the grid. The power generation system may therefore further comprise means for receiving a command via a communication link, and the control means may be arranged to control the power generation system in dependence on the command.

As an example, the control means may be operable to switch the power generation system between the first mode and the second mode in accordance with a command received via the communication link. This can allow a remote entity such as a grid company to convert the synchronous machine to a synchronous condenser in accordance with conditions elsewhere in the grid.

In the second mode, the reactive power of the synchronous machine may be controlled in accordance with a command received via the communication link. This can allow a remote entity such as a grid company to control the reactive power of the machine. This in turn may allow the remote entity to adjust the power factor of the grid in accordance with conditions elsewhere in the grid. For example, if a grid company determines that the grid has a leading power factor which is too low, it may control the synchronous machine to produce a lagging power factor to help compensate for the leading power factor produced elsewhere.

The power generation system may also be able to transmit information via the communication link. For example, parameters of the system may be monitored and transmitted via the communication link to a grid control centre.

During normal grid conditions, the synchronous machine running as a synchronous condenser can be used to assist in controlling the grid voltage and power factor by supplying or absorbing VARs (volt-amperes reactive).

The power generation system may further comprise a variable drive system between the synchronous machine and the prime mover. This can allow a prime mover operating at variable speed to drive the synchronous machine at the synchronous speed. For example, the prime mover may operate at a varying speed due to the fluctuating nature of the energy source, but may still be able to drive the synchronous machine at synchronous speed by virtue of the variable drive system.

The variable drive system may comprise, for example, a variable speed gearbox. Such a gearbox may have a single stage, or two, three or more stages in order to increase the range of speeds. Alternatively or in addition the variable drive system may comprise a hydraulic drive. This may have the advantage of isolating the prime mover from the synchronous machine.

In some circumstances the synchronous machine may initially be switched out of the electrical grid, and it may then be required to bring the synchronous machine into the grid in order to act as a synchronous condenser. Thus system may be arranged to bring the synchronous machine up to synchronous speed with the prime mover and then to decouple the synchronous machine from the prime mover when the synchronous machine is to operate as a synchronous condenser. Such an operation may be carried out under control of the control means, for example in response to a command received via a communications link.

At times it may be desirable to operate the synchronous machine as a synchronous condenser when there is not enough power available from the energy source to bring the machine up to synchronous speed. The power generation system may therefore further comprise an auxiliary motor for bringing the synchronous machine to synchronous speed when the synchronous machine is to operate as a synchronous condenser. The auxiliary motor may be, for example, an electrical motor powered by a battery or from the grid. Once the synchronous machine has been brought to synchronous speed by the auxiliary motor, the synchronous machine may be decoupled from the auxiliary motor, for example by means of a clutch or other coupling/decoupling device. The auxiliary motor may be controlled by the control means, for example in response to a command received via a communications link.

The power generation system may further comprise a prime mover for driving the synchronous machine. The prime mover may be, for example, a wind turbine, a wave turbine, a hydroelectric turbine, or any other source of mechanical power.

According to another aspect of the present invention there is provided a power generation and distribution system comprising a power generation system in any of the forms described above, and an electrical grid.

The electrical grid may further comprise a grid control centre comprising means for sending a command to the power generation system to control the operation of the synchronous machine as a synchronous condenser. For example, the grid control centre may send a command to the power generation system to decouple the synchronous machine from the prime mover so that the synchronous machine operates as a synchronous condenser, and/or to control the reactive power of the synchronous condenser, in order to assist in controlling the power factor of the grid. The grid control centre may be arranged to monitor a grid parameter and to control the operation of the synchronous machine in dependence on the monitored parameter. For example, the grid control centre may monitor the power factor of the grid at one or more locations, and may control the operation of the synchronous machine in dependence on the monitored power factor.

According to another aspect of the present invention there is provided a method of controlling a power generation system, the system comprising a synchronous machine and coupling means for coupling the synchronous machine to a prime mover, the method comprising selectively operating the system in a first mode in which the synchronous machine is coupled to the prime mover and acts as a synchronous generator to supply power to an electrical grid, and a second mode in which the synchronous machine is decoupled from the prime mover and acts as a synchronous condenser to adjust the power factor of the electrical grid.

According to a further aspect of the present invention there is provided a power generation system which supplies power to an electrical grid, the system comprising:

a synchronous machine;

a coupling device arranged selectively to couple and to decouple the synchronous machine to and from a prime mover; and a control unit arranged to control the system such that the system is selectively operable in two modes, wherein, in the first mode, the coupling device couples the synchronous machine to the prime mover and the synchronous machine acts as a synchronous generator to supply power to the electrical grid, and in the second mode, the coupling, device decouples the synchronous machine from the prime mover and the synchronous machine acts as a synchronous condenser to adjust the power factor of the electrical grid.

Features of one aspect of the invention may be applied to any other aspect. Apparatus features may be applied to the method aspect and vice versa.

BRIEF DESCRIPTION OF THE DRAWINGS

Preferred features of the present invention will now be described, purely by way of example, with reference to the accompanying drawings, in which.

Figure 1:
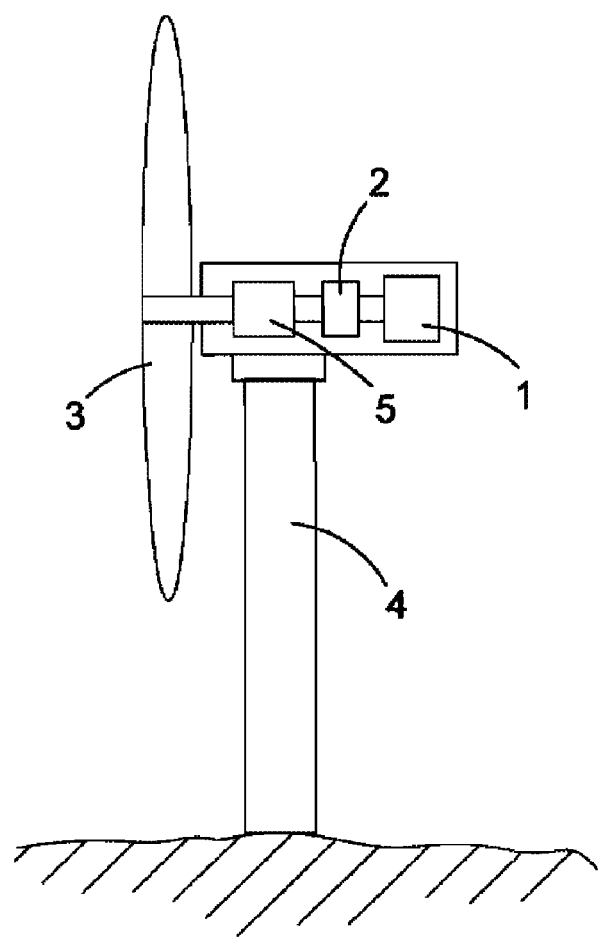
FIG. 1 shows the overall layout of a wind turbine in accordance with an embodiment of the invention.

DESCRIPTION OF PREFERRED
EMBODIMENTS OF THE INVENTION

Currently viable alternative energy sources included wind power, wave power and tidal flow. With the advent of variable speed drive technology in the form of variable speed gearboxes, hydraulic drives and others, it has become feasible to replace variable speed generating equipment with newer technologies utilizing a synchronous machine running at synchronous speed in parallel with the grid transmission or distribution system. An advantage of using synchronous machines running at synchronous speed is that that other power plants also use synchronous generators, and so the behaviour of all of the systems is similar. Other alternative energy designs mainly use inverter technologies. These technologies require complex power electronics, and only partially satisfy the requirements of grid companies in terms of their behaviour in response to variations in grid parameters.

Sources of alternative energy tend to be located at some distance from centres of population where the electrical power is required. This means that the best sites for alternative energy generation require relatively long cables, typically in the form of overhead lines, to connect the generator to the end user. For example, in the British Isles, the western coasts fronting the Atlantic are the best sites for wind and wave power, but are far removed from consumers of power. Transmission lines are therefore required to conduct this power to the customer.

Transmission lines over long lengths create a capacitance effect due to the long parallel conductors. This in turn pushes the power factor of the system into leading power factor due to the capacitance. If the leading power factor becomes too pronounced the system may become unstable.

During normal consumption, customer loads tend to restore the power factor by producing a reactive load Instead of capacitive load. Thus the capacitance effect of the transmission lines is generally not a problem during periods of normal consumption. However, during periods of light consumption, customer loads may not be sufficient to compensate for the capacitance effect of the transmission lines. If a leading power factor of somewhere around 0.9 is reached there is a distinct possibility of the system becoming unstable and the complete grid system being lost. To prevent this happening the grid companies typically switch in reactors at sub-stations to add reactive loads to the system and return the system to stable operating conditions, closer to unity or 1.0 pf (power factor).

However with the growth of distributed energy generation, of which alternative energy is a major contributor, the old paradigm of large power stations sending energy via transmission and distribution systems to the end user is no longer appropriate.

The new paradigm is for generation to take place anywhere on the network, and electricity flows may even be reversed in comparison to traditional systems. This creates a need for a more flexible approach to the control of the power factor.

Conditions during light grid loads, particularly in holiday shutdown season and during the hours typically from 0200-0600 hrs, when reactive load is small in comparison to the effect of capacitive loads of overhead lines, especially on long networks from alternative energy sources, can be a problem. The typical fix for this, having switched in all available reactors, is to shut down some transmission lines and to switch the load to a distribution network which is capable of meeting the loads at these times.

However, in order to promote the use of alternative energy, it is desirable to maximise the energy available from these sources at all times. This may create a need for reactive load power factor correction at different points in the network.

According to embodiments of the invention, the synchronous generator itself is arranged to act when appropriate as a synchronous condenser. In this way reactive power can be injected into the network at the point of generation to maintain the system stability. This is a marketable and sellable condition to the grid company, compensating for potential loss of power generated. The reactive power which is generated can be captured by appropriate metering.

FIG. 1 shows the overall layout of a wind turbine in accordance with an embodiment of the invention. Referring to FIG. 1, a synchronous machine 1 is coupled to a variable speed gearbox 2, which in turn is driven by a 2 or 3 stage increasing gearbox 5, which is driven by the main propeller shaft and blade arrangement 3. All of this is supported on a tower 4.

Figure 2:
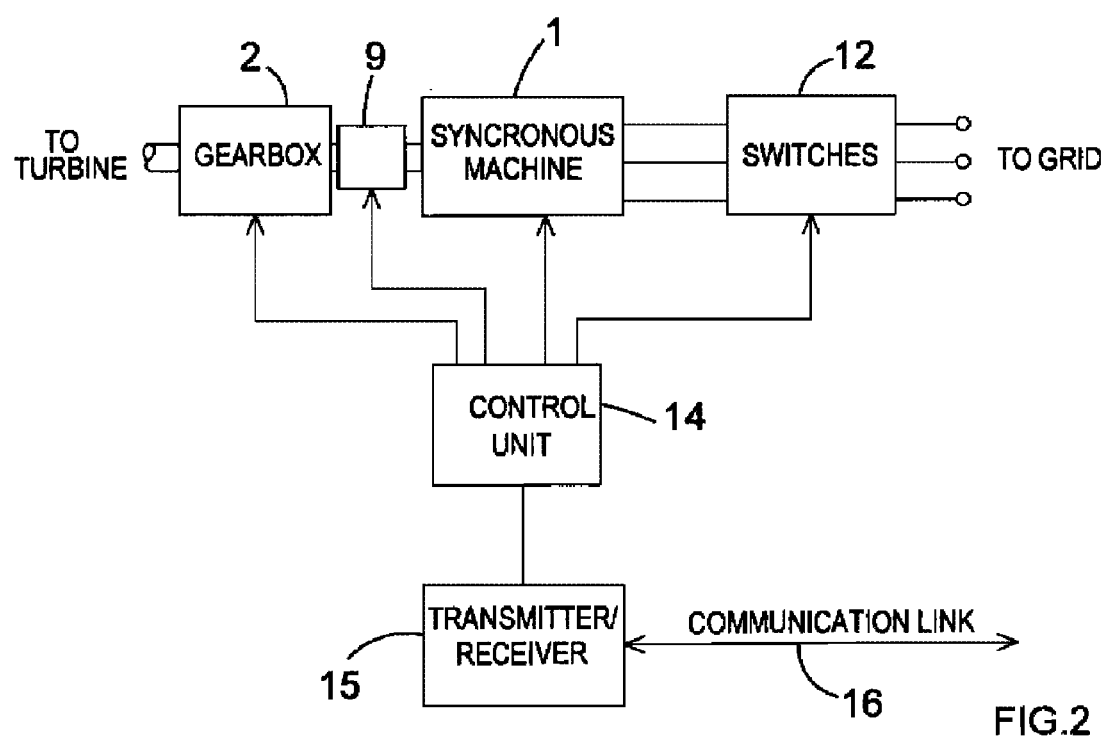
FIG. 2 shows in more detail parts of the wind turbine of FIG. 1.

FIG. 2 shows in more detail parts of the wind turbine of FIG. 1. Referring to FIG. 2, variable speed gearbox 2 is coupled to synchronous machine 1 by means of coupling and engaging clutch 9. The clutch 9 can be used to isolate the synchronous machine from the variable speed gearbox 2. The output of the synchronous machine is connected to an electrical grid via switches 12, which are typically circuit breakers controlled by relays. A control unit 14 is arranged to control the synchronous machine 1, gearbox 2, clutch 9 and switches 12. The control unit 14 can communicate by means of a transmitter/receiver 15 and communications link 16.

In normal operation the synchronous machine 1 functions as a synchronous generator. The machine is driven by the wind turbine, and the variable speed gearbox 2 converts the fluctuating speed of the turbine into the synchronous speed of the machine. In this mode of operation the synchronous machine supplies electricity to the electrical grid.

In accordance with an embodiment of the invention, the synchronous machine 1 is also operable as a synchronous condenser. In this mode of operation the synchronous machine is disconnected from the wind turbine by means of the clutch 9, but remains connected to the grid. Thus in this mode of operation the synchronous machine functions in effect as a synchronous motor without a load.

In order to run the synchronous machine as a synchronous condenser, the machine is first brought up to synchronous speed, synchronised and then declutched or uncoupled from the turbine.

The control unit 14 is then used to control the excitation of the synchronous condenser, in order to control the output of the machine as required to maintain stability and voltage.

During normal grid conditions, the synchronous condenser can be used to assist in controlling voltage and system power factor by external control means.

Therefore the synchronous condenser has the ability to control the voltage by absorbing or supplying reactive power, to control the system power factor.

In a preferred embodiment, control of the synchronous condenser is carried out remotely by the grid company. This is achieved by transmitting commands to the control unit 14 via transmitter/receiver 15 and communications link 16. This can give the grid company control of the system in order to adjust grid conditions.

The synchronous machine may be designed to operate across a range of power factors that would not normally be encountered by a synchronous generator. For example, the machine may be designed to run under-excited beyond 0.9 leading pf.

Figure 3:
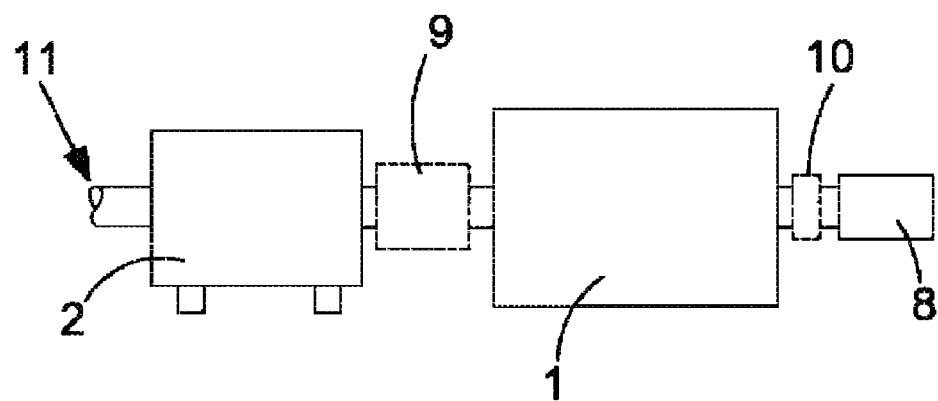
FIG. 3 shows parts of a wind turbine in accordance with another embodiment of the invention.

FIG. 3 shows parts of a wind turbine in accordance with another embodiment of the invention. In this embodiment a pony motor 8 is coupled to the generator 1 via engaging clutch/coupling 10. The pony motor is used to bring the synchronous machine up to synchronous speed when it is to be used as a synchronous condenser. This can allow the synchronous machine to operate as a synchronous condenser without having to rely on wind power to synchronise the machine. Once the machine is at synchronous speed the pony motor can be disconnected from the machine by means of the clutch 10. Rather than a variable speed pony motor, a fixed speed motor and belt drive with speed up ratio, or other variable drive system, could be used.

In this embodiment the pony motor 8 and clutch 10 are also operated under control of the control unit (not shown in FIG. 3).

Figure 4:
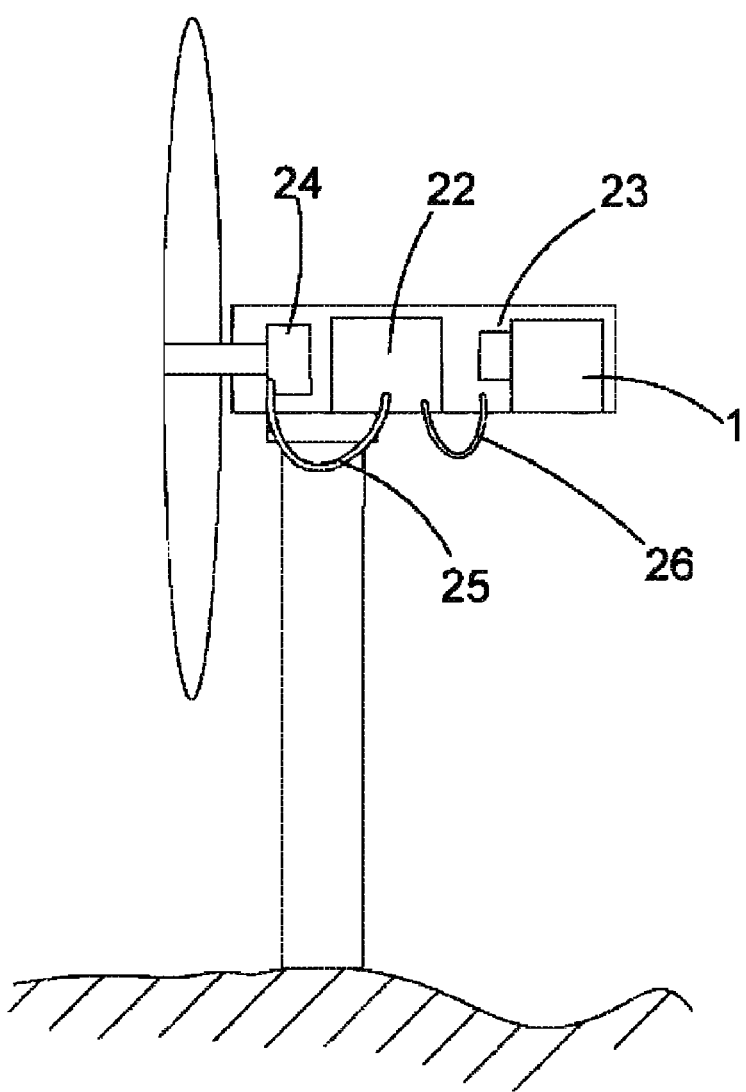
FIG. 4 shows an alternative type of drive arrangement.

FIG. 4 shows an alternative type of drive arrangement, where the main turbine and shaft drive a hydraulic pump 24, which delivers an hydraulic fluid via pipe 25 into an accumulator tank with bladder 22. The oil within this accumulator then drives a variable speed hydraulic motor 23 via pipe 26. The hydraulic motor 23 is used to drive the synchronous machine 1. The hydraulic drive system can be used to bring the synchronous machine up to synchronous speed, and then to transmit torque at a fixed speed to vary the load, dependant on the energy stored in the accumulator 22. In FIG. 4 the return oil feeds from motor 23 and pump 24 are omitted for clarity. The chief advantage of this system is that there is isolation between turbine input and the generator shaft.

Figure 5:
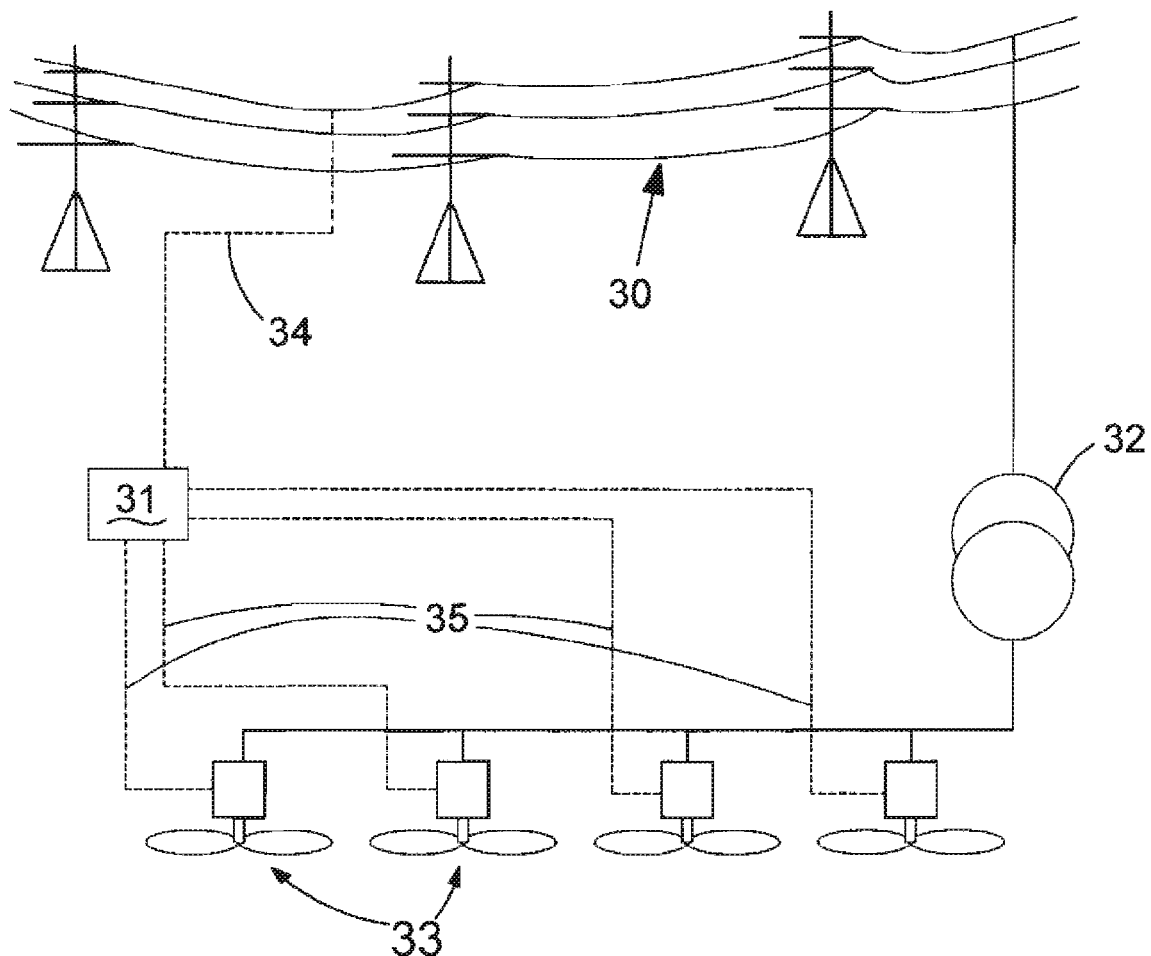
FIG. 5 shows parts of a grid system.

FIG. 5 shows parts of a grid system which enables an external grid company to correct and maintain suitable grid conditions. Referring to FIG. 5, a plurality of wind turbines 33 are connected to grid 30 by means of a step up transformer 32. A grid control centre 31 is used to control the grid. Grid parameters are measured and transmitted to the grid control centre via communication line 34. A plurality of communication lines 35 are provided between the grid location centre 31 and the wind turbines 33.

In FIG. 5, all of the wind turbines 33 are capable of operating as synchronous condensers. The grid control centre 31 determines which of the turbines should be operated as synchronous condensers, and transmits the appropriate commands via communication lines 35. The grid control centre 31 also transmits commands to/from the synchronous condensers to control the amount of reactive power that the synchronous condensers apply to the grid.

The communication lines 35 may be any type of communication link such as SCADA (Supervisory Control and Data Acquisition), wireless, hard-wired, and so forth.

Thus, by running the synchronous machine as a synchronous condenser, the machine can provide or absorb VAR (volts ampere reactive) from the grid, enabling improved voltage control and power factor control, and giving the grid company by external communication means to the synchronous condenser control system, a means of further improving the system stability.

Although embodiments of the invention have been described with reference to wind power, the present invention is applicable to any form of energy source including alternative energy sources and conventional energy sources.

The invention claimed is:

1. A wind turbine which supplies power to an electrical grid, the wind turbine comprising:
   a propeller arrangement;
   a synchronous machine;
   a coupling device which selectively couples and decouples the synchronous machine to and from the propeller arrangement; and
   a control unit which controls the system such that the system is selectively operable in two modes,
   wherein, in the first mode, the coupling device functionally couples the synchronous machine to the propeller arrangement and the synchronous machine acts as a synchronous generator to supply power to the electrical grid, and
   in the second mode, the coupling device functionally decouples the synchronous machine from the propeller arrangement and the synchronous machine acts as a synchronous condenser to adjust the power factor of the electrical grid.

2. The wind turbine according to claim 1 wherein, when the system is in the second mode, the synchronous machine adjusts the power factor of the electrical grid.

3. The wind turbine according to claim 1 wherein, when the system is in the second mode, the synchronous machine adjusts the voltage of the electrical grid.

4. The wind turbine according to claim 1, wherein the control unit controls the coupling device so that, in the first mode the coupling device couples the synchronous machine to the propeller arrangement, and in the second mode the coupling device decouples the synchronous machine from the propeller arrangement.

5. The wind turbine according to claim 1, wherein, in the first mode, the control unit controls the excitation of the synchronous machine in accordance with the electrical power which is to be supplied to the grid.

6. The wind turbine according to claim 1, wherein, in the second mode, the control unit controls the excitation of the synchronous machine in order to control the reactive power of the machine.

7. The wind turbine according to claim 1, wherein, when in the second mode, the synchronous machine operates with a leading power factor of less than 0.9.

8. The wind turbine according to claim 1, further comprising a variable drive system between the synchronous machine and the propeller arrangement.

9. The wind turbine according to claim 1, wherein the system brings the synchronous machine up to synchronous speed with the propeller arrangement and then decouples the synchronous machine from the propeller arrangement when the synchronous machine is to operate as a synchronous condenser.

10. The wind turbine according to claim 1, further comprising an auxiliary motor which brings the synchronous machine to synchronous speed when the synchronous machine is to operate as a synchronous condenser.

11. The wind turbine according to claim 1, further comprising a receiving unit which receives a command via a communication link, wherein the control unit controls the system in dependence on the command.

12. The wind turbine according to claim 11, wherein the control unit switches the system between the first mode and the second mode in accordance with a command received via the communication link.

13. The wind turbine according to claim 11, wherein, in the second mode, the reactive power of the machine is controlled in accordance with a command received via the communication link.

14. A power generation and distribution system comprising an electrical grid and a wind turbine which supplies power to the electrical grid, the wind turbine comprising:
   a propeller arrangement;
   a synchronous machine;
   a coupling device which selectively couples and decouples the synchronous machine to and from the propeller arrangement; and
   a control unit which controls the system such that the system is selectively operable in two modes,
   wherein, in the first mode, the coupling device functionally couples the synchronous machine to the propeller arrangement and the synchronous machine acts as a synchronous generator to supply power to the electrical grid, and
   in the second mode, the coupling device functionally decouples the synchronous machine from the popeller arrangement and the synchronous machine acts as a synchronous condenser to adjust the power factor of the electrical grid.

15. A power generation and distribution system according to claim 14 further comprising a grid control center, the grid control center comprising a transmission unit which sends a command to the wind turbine to control operation of the synchronous machine as a synchronous condenser.

16. A power generation and distribution system according to claim 15, wherein the grid control center monitors a grid parameter and controls the operation of the synchronous machine in dependence on the monitored parameter.

17. A method of controlling a wind turbine, the wind turbine comprising a propeller arrangement, a synchronous machine, and coupling means for functionally coupling the synchronous machine to the propeller arrangement, the method comprising;
selectively operating the wind turbine in a first mode in which the synchronous machine is functionally coupled to the propeller arrangement and acts as a synchronous generator to supply power to an electrical grid, and a second mode in which the synchronous machine is functionally decoupled from the propeller arrangement and acts as a synchronous condenser to adjust the power factor of the electrical grid.

18. A power generation system which supplies power to an electrical grid, the system comprising:
a synchronous machine;
a coupling device which selectively couples and decouples the synchronous machine to and from a prime mover;
a control unit which controls the system such that the system is selectively operable in two modes,
wherein, in the first mode, the coupling device functionally couples the synchronous machine to the prime mover and the synchronous machine acts as a synchronous generator to supply power to the electrical grid, and
in the second mode, the coupling device functionally decouples the synchronous machine from the prime mover and the synchronous machine acts as a synchronous condenser to adjust the power factor of the electrical grid; and
a receiving unit which receives a command from a grid control center via a communication link, wherein, in the second mode, the reactive power of the synchronous machine is controlled in accordance with the command received from the grid control center to adjust the power factor of the electrical grid.

* * * * *